Sept. 24, 1968  R. S. FARR  3,402,531
PAPER FILTER FOR LOCOMOTIVES AND METHOD OF ASSEMBLY
Filed Aug. 4, 1966  2 Sheets-Sheet 1

RICHARD S. FARR
INVENTOR.

BY Lyon & Lyon
ATTORNEYS

Sept. 24, 1968 R. S. FARR 3,402,531
PAPER FILTER FOR LOCOMOTIVES AND METHOD OF ASSEMBLY
Filed Aug. 4, 1966 2 Sheets-Sheet 2

RICHARD S. FARR
INVENTOR.

BY Lyon & Lyon
ATTORNEYS

United States Patent Office 3,402,531
Patented Sept. 24, 1968

3,402,531
PAPER FILTER FOR LOCOMOTIVES AND METHOD OF ASSEMBLY
Richard S. Farr, Los Angeles, Calif., assignor to Farr Company, Los Angeles, Calif., a corporation of California
Filed Aug. 4, 1966, Ser. No. 570,203
10 Claims. (Cl. 55—350)

ABSTRACT OF THE DISCLOSURE

A compact filter assembly for providing a large filter area in a relatively small and inaccessible space, the assembly comprising individual filter elements each including pleated paper filter panels mounted in a zig-zag configuration in a housing. A plurality of the elements may be mounted in a side-by-side and stacked relationship to provide the assembly which is particularly useful for filtering the intake air of a locomotive engine or the like.

---

This invention relates to a filter and more particularly to a compact paper filter assembly of separable cells for filtering the intake air of a locomotive engine or the like.

Present day diesel-electric locomotives employ a diesel engine driving an electrical generator which in turn supplies power to the traction motors which drive the wheels of the locomotive. The air for the engine must be filtered in order to ensure that the engine receives clean air. Locomotives of this type conventionally have a compartment housing inertial type separators for separating dust from air taken into the compartment and also housing various other components. The cleaned air then is filtered and supplied to the engine. Air from the separators also is supplied to the generator and motors for cooling purposes. A high volume of well filtered air is necessary for the proper operation of the engine, but the filter compartment of the locomotive is relatively compact and cramped making it difficult to provide a large filter, or one having a large filter area, therein. Furthermore, the restricted access within the compartment renders installation and servicing of the filter relatively difficult.

Accordingly, it is an object of the present invention to provide an improved filter assembly for locomotives.

It is another object of this invention to provide a paper filter assembly for locomotives having a large filter area but which is relatively compact and includes plural filter elements which are readily serviceable.

A further object of this invention is to provide a filter assembly employing paper filters for filtering the engine intake air of locomotives, and which provides a maximum filter area in a relatively compact space and is relatively easy to service.

An additional object of the invention is to provide a novel filter element containing filter panels, a plurality of said filter elements being adapted to be mounted in an adjacent relationship for providing an improved filter assembly.

Another object of this invention is a method of constructing a filter element.

These and other objects of the invention will be better understood by reference to the following description taken in conjunction with the accompanying drawings in which.

Figure 1:
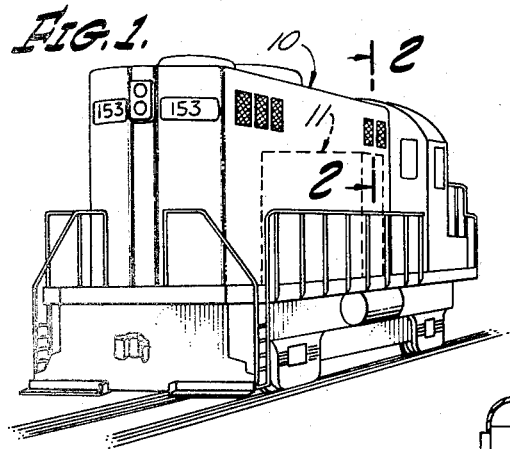
FIGURE 1 is a perspective view of a typical diesel-electric locomotive.
Figure 2:
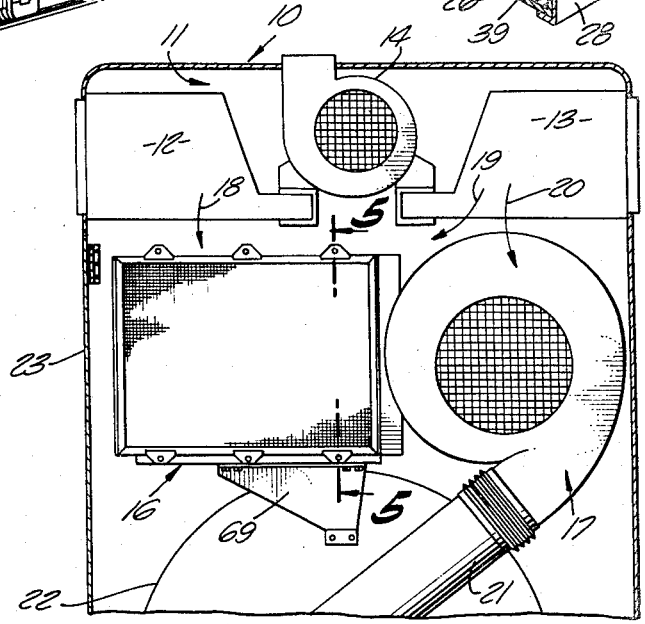
FIGURE 2 is a cross-sectional view of the locomotive taken along a line 2—2 of FIGURE 1 showing the interior of the forward compartment thereof, and the inlet end of a locomotive filter assembly according to the invention.

Referring now to the drawings, a diesel-electric locomotive 10 is illustrated in FIGURE 1 and has a compartment indicated by dashed lines 11 toward the cab within which the filter assembly of the present invention is situated. FIGURE 2 illustrates in cross section the compartment 11 and the various components housed therein. Conventional inertial type separators 12 and 13 are provided in the compartment 11 for separating dust and other foreign particles from air drawn into the compartment. A bleed air blower 14 is coupled with the separators 12 and 13 for withdrawing the separated dust and particles from the separators and discharging them from the locomotive.

A locomotive paper filter assembly 16 according to the invention and a blower 17 receive air, indicated by arrows 18 through 20, from the separators 12 and 13. The assembly 16 supplies air to the intake of the engine of the locomotive which requires extremely clean air and the blower 17 supplies cooling air through a duct 21 to the generator 22 and traction motors (not shown) of the locomotive. A door 23 is provided on the side of the locomotive and allows access to the compartment 11 for service of the components therein. As noted previously, this compartment 11 is relatively compact and cramped, and access to the components therein is relatively restricted because of the number and size of these components. Thus, not only is it difficult to find sufficient space to mount a relatively efficient filter having a large filter area within this compartment, but also if a filter of any reasonable size is provided, it is relatively difficult to install and service.

Figure 3:
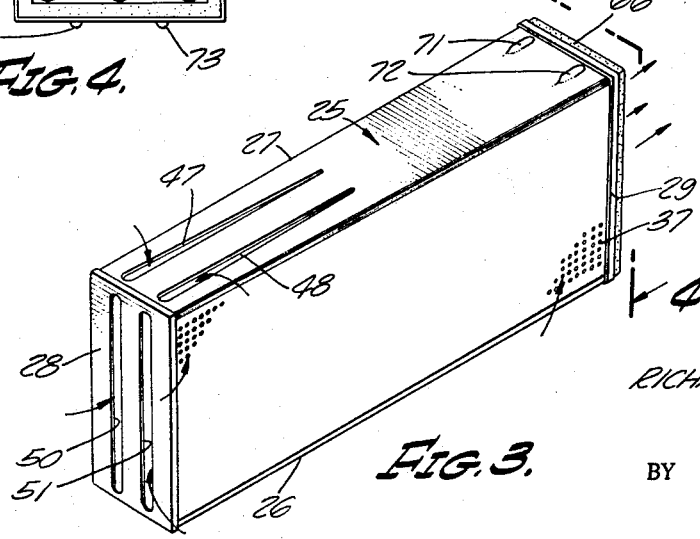
FIGURE 3 is a perspective view of a filter element according to the invention.
Figure 5:
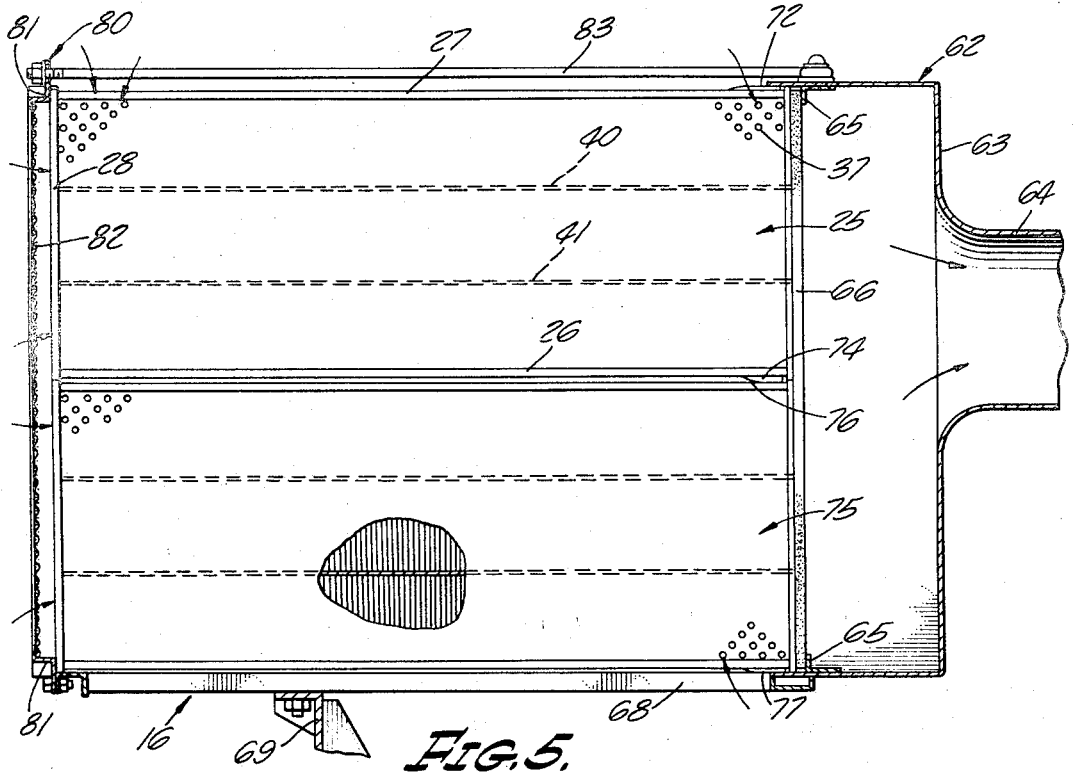
FIGURE 5 is a cross-sectional view of the locomotive filter assembly taken along a line 5—5 of FIGURE 2.
Figure 6:
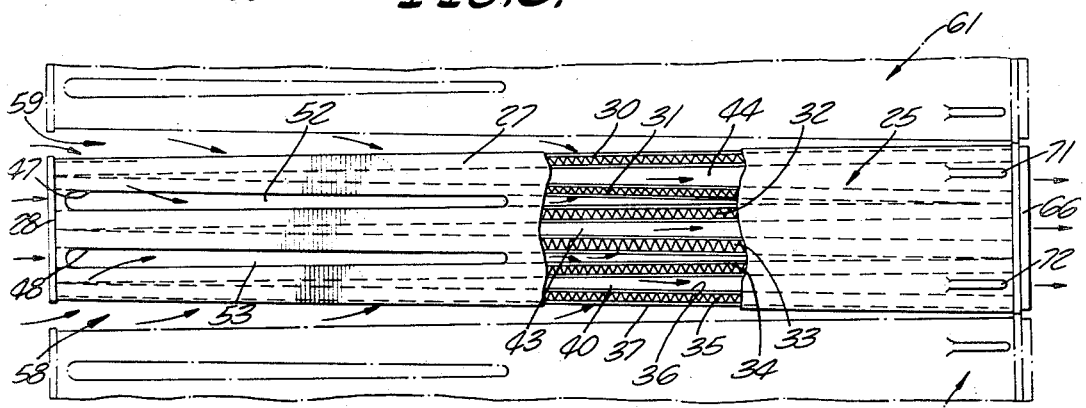
FIGURE 6 is a partial plan view of the assembly shown in FIGURE 5.

According to a feature of the present invention, a locomotive filter assembly providing a large filter area, but which is still relatively compact in size and easy to service, is provided. This assembly includes a plurality of filter cells or element mounted in a stacked or tiered relationship as shown in FIGURE 5. Typically, two rows of six filter elements are stacked one above the other as partially shown in FIGURES 5 and 6. FIGURE 3 illustrates one filter cell or element 25 having a housing including a bottom pan 26, a top pan 27, a front pan 28 and a rear pan 29. These pans are secured together, as by an adhesive, and house a plurality of flexible pleated paper filter panels 30 through 35 as shown in FIGURE 6. Each filter panel is covered on both sides by perforated paper sheets, such as the perforated paper sheets 36 and 37 covering the paper filter panel 35.

Figure 8:
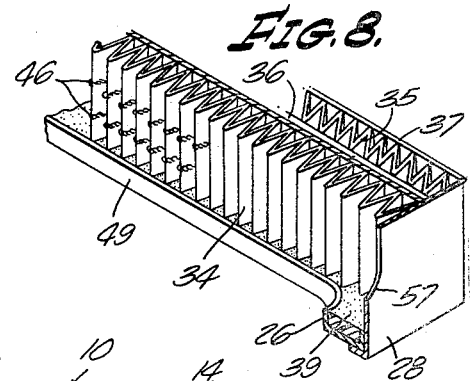
FIGURE 8 is a partial perspective view of a paper filter panel within a filter element.
Figure 4:
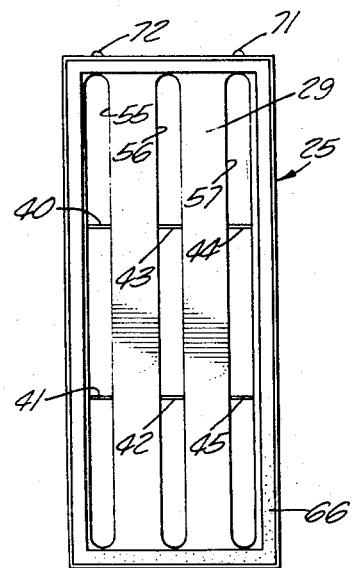
FIGURE 4 is a rear, or downstream view of the filter element taken along a line 4—4 of FIGURE 3.

Adjacent paper filter panels 30 through 35 are arranged in a V configuration, as best seen in FIGURE 6, extending from the front to the rear pans thereby forming a zig-zag configuration of the panels. The spaced ends of the V's opposite the apexes thereof at the upstream end of the filter element may be termed the inlet ends, and each provides a wedge-shaped space or converging passageway for air to enter. The spaced ends of the V's at the downstream end may be termed the outlet ends, and each provides a wedge-shaped space or diverging passageway for clean air. These panels are secured to the bottom pan 26 by a deep layer of glue or adhesive 39 as shown in FIGURE 8 which serves both to secure the panels to the pan and to seal against air by-passing around the panel edges. Likewise, the panels may be similarly secured and sealed to the front and rear pans 28 and 39, and to the top pan 27. Cardboard V-shaped wedges are provided between adjacent paper filter panels in the downstream wedge spaces defined by the "mouth ends" of the V's to provide support and prevent buckling of the panels as a result of air flow therethrough. FIGURE 4, which is a rear view of the filter element shown in FIGURE 3, shows cardboard wedges 40 through 45 arranged between the associated paper filter panels. The upper wedges 40, 43 and 44 also are seen in FIGURE 6. Even though perforated paper is glued to the sides of the paper filter panels and increases the rigidity thereof, additional structural strength is needed at the downstream end because of the stresses caused by the differential pressure and the velocity of air flow through the panels. The cardboard wedges provide the needed additional strength. These wedges are glued between the panels, and this may be accomplished by employing a suitable jig. Preferably, a plurality of string spacers, such as string spacers 46 as shown in FIGURE 8, are glued along the upstream side of the paper filter panels prior to pleating and the application of the perforated paper backing to allow room for dirt build-up.

Inlet openings or slots are provided at the upstream end of each filter element in the top, bottom and front pans thereof. The top pan includes elongated openings 47 and 48. The bottom pan 36 is identical thereto and includes similar openings, one opening 49 being seen in FIGURE 8. The front pan 28 includes inlet openings 50 and 51. The openings 47 and 48 in the top pan, the similar openings in the bottom pan 26 and the openings 50 and 51 in the front pan 28 allow air to enter the upstream side or end of the filter element and flow into the space between the paper filter panels. Thus, as shown in FIGURE 6, air enters these openings and flows into the wedge-shaped spaces or passageways 52 and 53 between the respective paper filter panels 31 and 32, and 33 and 34 at the spaced ends of the V's defined by these paper filter panels. The openings in the top, bottom and front pans are approximately the same size and configuration as the spaces 52 and 53 between the panels at the upstream end of the element. The air flows through the perforated backing on these paper filter panels, through the panels themselves, and exits through the paper backing on the other sides thereof. The air thus exits into the downstream wedge-shaped spaces or passageways defined between the paper filter panels 30 and 31, 32 and 33, and 34 and 35. The air then exits through openings 55, 56, 57 (FIGURE 4) in the rear pan 29. Air also may enter a filter element through the spaces between adjacent elements, such as spaces 58 and 59 between respective elements 25 and 60, and 25 and 61 as seen in FIGURE 6.

A plenum frame assembly 62 is mounted in the compartment 11 and includes a plenum chamber 63 communicating through a duct 64 to the intake of the diesel engine. A rectangular flange 65 is secured in the plenum chamber 63 and provides a sealing surface for the rear of the filter elements. Each of the filter elements includes a gasket mounted on the rear pan, such as a gasket 66 mounted on the rear pan 29 of the element 25. These gaskets are secured by a suitable adhesive and provide a seal with the flange 65. This arrangement enables a good seal to be provided between the plenum chamber and the downstream end of a plurality of separate filter elements arranged in rows or columns or in stacked rows. The plenum frame assembly 62 further includes a frame 68 which supports the lower row or tier of filter elements. A bracket assembly 69, as best seen in FIGURE 2, is attached to the frame 68 and attached within the compartment 11 to support and retain the entire filter assembly.

Figure 7:
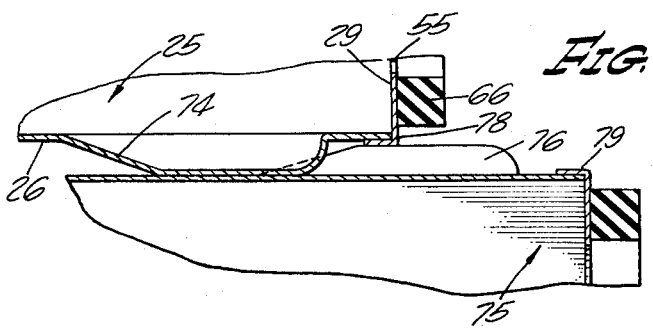
FIGURE 7 is a fragmentary sectional view of a portion of the assembly shown in FIGURE 5.

Each of the filter elements includes a pair of protuberances or beads formed in the top and bottom pans near the rear thereof. Thus, the top pan 27 of the filter element 25 includes beads 71 and 72, and a similar pair of beads 73 and 74 on the bottom pan 26 thereof as seen in FIGURE 4. The top and bottom beads are offset so that the bottom beads of one element do not interfere with the top beads of a lower element. A filter element assembly 75 located below the assembly 25 as shown in FIGURE 5 likewise includes pairs of these beads on the top and bottom pans thereof, only beads 76 and 77 being seen in FIGURE 5. These beads facilitate installation and removal of the individual filter element assemblies, and cause the bottom pan of an upper element to ride up on the beads of a lower element to prevent the flanged ends of the respective end pans from engaging each other. As can be seen in FIGURE 7 these beads prevent the flanged ends 78 and 79 of the respective back pans of the elements 25 and 75 from engaging or catching on each other. This is particularly useful in that the filter elements must be slid in from the front for installing and it is virtually impossible to reach the rear end of the upper tier elements to lift them clear of the flange interference.

The filter elements are installed in the plenum frame assembly 62 starting with the filter elements closest to the blower 17, and working toward the opposite side of the compartment 11, and the last upper and lower elements may be installed simultaneously. A retaining frame assembly 80, which includes a frame 81 and protective inlet screen 82 attached thereto, is then positioned over the front pan ends of the filter elements. The bottom of the frame 81 is bolted to the frame 68, and the top thereof is attached to the plenum chamber 63 by means of a plurality of tie bolts, such as a bolt 83. It will be noted from FIGURE 6 that the upstream ends of the filter elements are smaller than the downstream ends thereof thereby providing the spaces 58 and 59 between adjacent elements. Proper positioning of the front pans of these elements may be provided by spacer tabs (not shown) formed in and extending from the frame 81 to between the front pans of adjacent elements.

A paper filter assembly for a locomotive as illustrated and described above, for example, typically may include twelve filter elements as shown in FIGURE 3 each having an approximate length of 36 inches. The overall filter assembly may have a height of approximately 28 inches and a width of approximately 47 inches as viewed at the inlet screen end thereof in FIGURE 2. A twelve element assembly of this nature provides approximately three thousand square feet of filter paper and a typical air flow of ninety-three hundred cubic feet per minute.

What is claimed is:
1. A filter element adapted to be mounted in a side-by-side and stacked relationship with like filter elements by a frame member for filtering air supplied to the intake of a locomotive engine, or the like, comprising
  housing means having front, rear, top and bottom sides, said front and rear sides respectively serving as the upstream and downstream ends of said element, each of said sides having plural openings therein,
  a plurality of pleated paper filter panels secured within said housing means and extending substantially from the front to rear sides thereof in a zig-zag configuration with the apexes of said panels abutting said front and rear sides thereby forming wedge-shaped inlet and outlet spaces, said openings in said front, top and bottom sides of said housing means communicating with the inlet wedge-shaped spaces, and said openings in said rear side of said housing means communicating with said outlet wedge-shaped spaces, and said front side of said housing means being narrower than the rear sides thereof, and said top and bottom sides of said housing means being slightly tapered to provide additional wedge-shaped inlet spaces when a plurality of said filter elements are mounted side by side.

2. An element as in claim 1 including wedge-shaped supporting members secured to said panels within the outlet wedge-shaped spaces to increase the structural strength of said panels.

3. An element as in claim 1 wherein said top and bottom sides of said housing means are substantially identical and include protuberances near the downstream ends thereof for facilitating stacking of one filter element upon another.

4. An element as in claim 3 including wedge-shaped supporting members secured to said panels within the outlet wedge-shaped spaces to increase the structural strength of said panels.

5. A compact filter assembly for providing a large filter area in a relatively small and relatively inaccessible space comprising
a plurality of individual filter elements,
each of said filter elements includes a plurality of pleated paper filter panels having a perforated backing thereon, said filter panels being secured within a housing having open sides and mounted therein in a zig-zag configuration with plural apexes adjacent both the upstream and the downstream ends of said housing forming plural wedge-shaped air inlet and outlet spaces, said housing including front, rear, top and bottom pans, said top and bottom pans include elongated openings having a size and configuration similar to the longitudinal configuration of said inlet spaces, and said front and rear pans having elongated openings substantially corresponding to the transverse configuration of the respective inlet and outlet spaces,
said housings of said elements are tapered from the upstream to the downstream ends thereof to provide additional inlet spaces between adjacent elements, and
said plurality of individual filter elements are mounted together and retained in an adjacent relationship by a supporting and retaining frame means.

6. An assembly as in claim 5 wherein said top and bottom pans are tapered from the inlet to the outlet of an element and the width of said front pan is smaller than the width of said rear pan.

7. An assembly as in claim 6 wherein said top and bottom pans include protuberances near the downstream ends thereof for facilitating stacking of one filter element upon another.

8. An assembly as in claim 5 wherein each of said filter elements includes a rear pan having a flange and top and bottom pans attached to said flange, said top and bottom pans include protuberances for preventing engagement of the flanges of the back pans of upper and lower filter elements during installation and removal thereof with said supporting and retaining frame means.

9. A filter assembly for filtering air supplied to the intake of a locomotive engine, or the like, comprising
plenum assembly means adapted to be secured within a compartment of said locomotive, and including a plenum chamber for supplying air to the intake of an engine of said locomotive,
a supporting frame coupled to said plenum chamber,
a plurality of filter element means mounted in a side-by-side and stacked relationship on said frame for filtering air supplied to said plenum chamber, and
each of said filter element means including pan means housing a plurality of pleated paper filter panels mounted in a zig-zag configuration with plural apexes adjacent both the upstream and downstream ends of said pan means and forming plural wedge-shaped air inlet and outlet spaces, said pan means including upstream openings and downstream openings therein for allowing air to pass into and from said respective inlet and outlet spaces, said pan means having a rear pan with a flange and top and bottom pans attached to said flange with said top and bottom pans including elongated openings having a size and configuration similar to the longitudinal configuration of said inlet spaces, and said top and bottom pans include protuberances for preventing engagement of the flanges of the back pans of upper and lower filter element means during installation and removal thereof with said plenum assembly means.

10. A method of forming a filter element comprising applying a layer of adhesive to first and second pan sides,
mounting the edges of a plurality of paper backed pleated paper filter panels in said adhesive layers with said panels arranged in a zig-zag configuration to form plural wedge-shaped air inlet and outlet spaces,
gluing cardboard wedges between adjacent panels in the wedge-shaped outlet spaces, and
applying a layer of adhesive to front and rear pans, and joining said front and rear pans to said first and second side pans with the upstream ends of said panels being secured in the adhesive layer in said front pan and the downstream ends of said panels being secured in the adhesive layer in said rear pan.

References Cited

UNITED STATES PATENTS

| 1,863,015 | 6/1932 | Kamrath | 55—521 |
| 2,016,033 | 10/1935 | Christofferson | 55—521 |
| 2,198,190 | 4/1940 | Vokes | 55—497 |
| 2,420,599 | 5/1947 | Jurs | 55—521 |
| 2,915,426 | 12/1959 | Poelman | 55—521 |
| 3,025,963 | 3/1962 | Bauer | 210—493 |
| 3,071,915 | 1/1963 | Hardy | 55—324 |
| 3,116,700 | 1/1964 | Aydelott | 55—322 |
| 3,151,962 | 10/1964 | O'Dell | 55—350 |
| 3,280,985 | 10/1966 | Czerwonka | 55—485 |

FOREIGN PATENTS

| 1,239,451 | 7/1960 | France. |
| 1,275,496 | 10/1961 | France. |
| 565,265 | 11/1944 | Great Britain. |
| 880,427 | 10/1961 | Great Britain. |

HARRY B. THORNTON, *Primary Examiner.*

B. NOZICK, *Assistant Examiner.*